United States Patent [19]

Sabater et al.

[11] Patent Number: 4,978,861
[45] Date of Patent: Dec. 18, 1990

[54] DEVICE FOR THE CONTINUOUS DETERMINATION OF A SURFACE STATE INDEX FOR A MOVING CREPED SHEET

[75] Inventors: Jacques Sabater, Gif sur Yvette; Jean C. Kerneis, Saint Egreve; Serge Bauduin, La Tronche, all of France

[73] Assignee: Centre Technique de l'Industrie des Papiers, Cartons et Celluloses, France

[21] Appl. No.: 359,745

[22] PCT Filed: Sep. 13, 1988

[86] PCT No.: PCT/FR88/00448
§ 371 Date: Apr. 19, 1989
§ 102(e) Date: Apr. 19, 1989

[87] PCT Pub. No.: WO89/02573
PCT Pub. Date: Mar. 23, 1989

[51] Int. Cl.⁵ .......................................... G01N 21/86
[52] U.S. Cl. .................................... 250/571; 356/371
[58] Field of Search ...................... 250/571, 572, 562; 356/371, 237, 238

[56] References Cited

U.S. PATENT DOCUMENTS

| | | | |
|---|---|---|---|
| 3,700,903 | 10/1972 | Adler et al. | 356/371 |
| 3,719,421 | 3/1973 | Poilleux et al. | 356/371 |
| 3,804,521 | 4/1974 | Sprague | 356/371 |
| 4,017,188 | 4/1977 | Sawatari | 356/371 |
| 4,019,066 | 4/1987 | Lucas et al. | 250/562 |
| 4,145,140 | 3/1979 | Fuji | 356/371 |
| 4,202,630 | 5/1980 | Suzuki et al. | 356/371 |
| 4,290,698 | 9/1981 | Milana | 356/371 |
| 4,364,663 | 12/1982 | Gardner et al. | 356/371 |
| 4,714,348 | 12/1987 | Makosch | 356/371 |
| 4,764,016 | 8/1988 | Johanson | 356/371 |
| 4,859,062 | 8/1989 | Thurn et al. | 356/371 |

FOREIGN PATENT DOCUMENTS

| | | |
|---|---|---|
| 3503858 | 8/1986 | Fed. Rep. of Germany . |
| 2208107 | 6/1974 | France . |
| 57-33306 | 2/1982 | Japan . |
| 57-166505 | 1/1983 | Japan . |
| 59-143907 | 12/1984 | Japan . |
| 2025041 | 1/1980 | United Kingdom . |

Primary Examiner—David C. Nelms
Assistant Examiner—Stephone B. Allen
Attorney, Agent, or Firm—Arnold, White & Durkee

[57] ABSTRACT

A device for the continuous determination of a surface state index for a moving sheet, creped in the form of undulations, comprising a light source, a first optical system, a cell intended to receive the back-scattered beam and a system for processing the beam, wherein: the light source is a laser source; the first optical system is an astigmatic system, intended to adapt the size of the laser beam at the point where it meets the sheet to the average pitch of the said undulations in the moving creped sheet; the cell is an optoelectronic cell whose sensitive surface receives at least part of the back-scattered light, concentrated by a second convergent optical system; and the processing system comprises a means for determining a surface state index for the sheet from the electrical signals.

9 Claims, 3 Drawing Sheets

DEVICE FOR THE CONTINUOUS DETERMINATION OF A SURFACE STATE INDEX FOR A MOVING CREPED SHEET

The present invention relates to a device for the continuous determination of a surface state index for a moving creped sheet, particularly for a sheet of creped paper.

By a "surface state index" is meant a value which indicates the undulatory variations of the surface of a material in the form of sheet along one of its dimensions, in comparison with the plane surface of the same material.

The paper-making industry produces large quantities of paper described as quilted or creped, i.e. papers having undulations that are difficult to see with the naked eye. This type of paper is mainly used for its absorbent qualities that are due to the increase in its surface density when undulations are present. It is generally "bonded" a variable number of times to paper of the same type in order to obtain the thickness required for the intended use (kitchen paper, table napkin, etc.).

In a known way, creped or microcreped paper is continuously manufactured in rolls using a rotating cylinder 10 to 30 meters per second at its periphery) of considerable size (4 to 7 meters in diameter and several meters in width) known in the trade as a "yankee". The paper is deposited on the rotating yankee while still very wet (two to three times more water than fibers), thus enabling it to be partially dried. A doctor of dimension equal to that of the generatrix of the yankee is maintained in contact with it. The function of the doctor is to produce the creping of the sheet of paper, i.e. to produce undulations which are more or less perpendicular to the direction of motion of the sheet of paper and which have dimensions depending on the intended use.

The doctor generally consists of a replaceable steel blade. In fact, with the yankee being made from cast iron and because it rotates at high speed and the doctor is pressed permanently onto it, the doctor is observed to wear very rapidly; if the doctor is not changed frequently, the edge in contact with the yankee becomes bevelled, thus producing irregular creping or even none at all.

At present, no methods for monitoring the quality of the paper are known other than visual, and therefore subjective, observation.

One of the criteria for the quality of the creping is the depth of the undulations, the magnitude of which is directly related to three parameters:
  The wear in the doctor, for the reasons mentioned above;
  the composition of the paper pulp;
  the quality of the hemicellulose layer, called the "skin", related to the quality of the paper pulp, which covers the yankee and acts as an adhesive for the paper during the creping phase. In fact, the absence of this layer is observed to produce as well as accelerate wear in the doctor, irregular creping of the paper or even its break-up.

One of the aims of the present invention, when applied in the paper-making industry, is to guarantee the quality of the creped paper and to provide a way of monitoring the wear in the doctor.

Another aim of the present invention is to carry out continuous measurement of the amplitude of the undulations in any type of sheet material subjected to creping or similar treatment.

The present invention proposes a device for the continuous determination of a surface state index for a moving sheet, creped in the form of undulations, of the type comprising:
  a light source emitting a beam directed onto the surface of the moving creped sheet;
  a first optical system, intended to concentrate the beam emitted by the source and to form a luminous spot on the surface of the sheet to be analyzed;
  a cell intended to receive the beam back-scattered by the moving sheet, arranged on the same side of the sheet as the first optical system;
  a system for processing the back-scattered beam.

In this device:
  the light source is a laser source;
  the first optical system is an astigmatic system, intended to transform the shape of the laser beam in such a way that, at the point where it meets the sheet, the luminous spot is adapted to the direction of the undulations and to the dimensions of the average pitch of the undulations;
  the cell is an optoelectronic cell whose sensitive surface receives at least part of the back-scattered light, concentrated by a second convergent optical system, the optoelectronic cell delivering at least one electrical signal depending on the position of the point of impact of the back-scattered light beam delivered by the convergent optical system onto the sensitive surface;
  and the processing system comprises a means for determining a surface state index for the creped sheet from the electrical signals.

In other words, the invention comprises firstly the production of an electrical signal by the optical proximity detection method and then, by suitable means, the production of directly usable electrical output signals which reconstitute the geometrical data on the creped sheet. To do this, according to the invention, a spot of determined dimensions is formed on the surface of the creped sheet. When this sheet moves in front of the apparatus, this spot is displaced by an amount that depends on the surface profile of the sheet. The movements of the spot are then detected in the direction perpendicular to the plane of the sheet, making sure that there is a complete lack of sensitivity to any modulations in the light intensity liable to accompany these movements. In this way, an electrical signal is obtained whose time variations form an analog representation of the surface profile of the sheet to be analyzed. For this representation to be faithful, it is important that the small dimension of the spot shall be less than the average pitch of the undulations. The variations in the electrical signal contain all the information from which the geometrical parameters of the undulations of the creping are determined: amplitudes, wavelengths, waveforms . . . . These parameters are then reconstituted in the form of electrical output signals, available continuously and in real time.

In practice, the following features can advantageously be adopted:
  the light source is a helium-neon laser or a semiconductor laser combined with an optical collimating system;
  the astigmatic optical system matched to the laser beam is intended to give an elliptical shape to the luminous spot at the point where it meets the sheet to be analyzed, the major axis of this ellipse being arranged parallel to the undulations on the creped sheet to be analyzed and the minor axis of the ellipse having a length less than the average pitch of the undulations;

the signal depending on the variations in position is passed through a high-pass filter in order to remove the stray low frequencies;

the filtered signal at the output of the high-pass filter is processed by at least one module enabling at least one of the following values to be determined:
peak-to-peak,
effective or RMS value;

the device also comprises a divider module for evaluating the form factor of the filtered signal from the indications given by the RMS module and the peak-to-peak module;

the material analyzed is creped paper;

the device also comprises a means for evaluating the average pitch of creping;

the device also includes a means for setting and maintaining the average position of the point of impact of the luminous spot formed on the optoelectronic cell (this position to be at the center of the cell) in order to reduce the effect of the variations in the back-scattered light and, as a result, to permit good reproducibility of the measurements; to achieve this, a mirror whose position is automatically controlled is used with advantage.

The manner in which the invention may be realized and the advantages which follow from it will emerge more clearly from the examples of its embodiment which follow in support of the appended figures.

Figure 1:
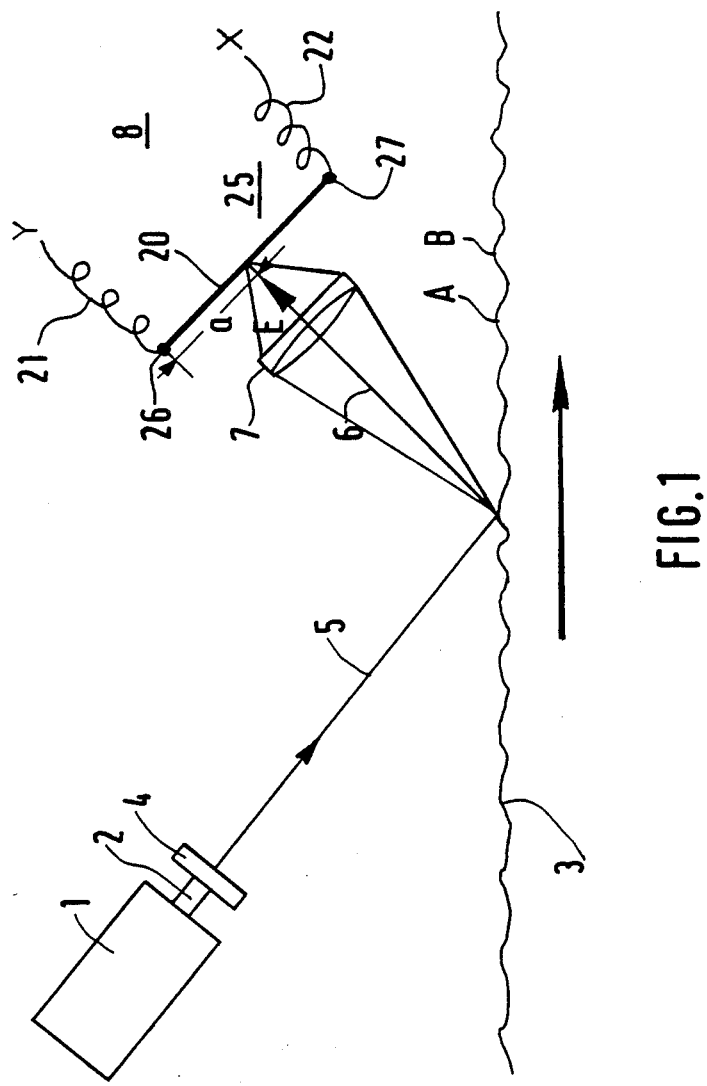
FIG. 1 is a diagrammatic representation of the optical system of the device according to the invention.
Figure 2:
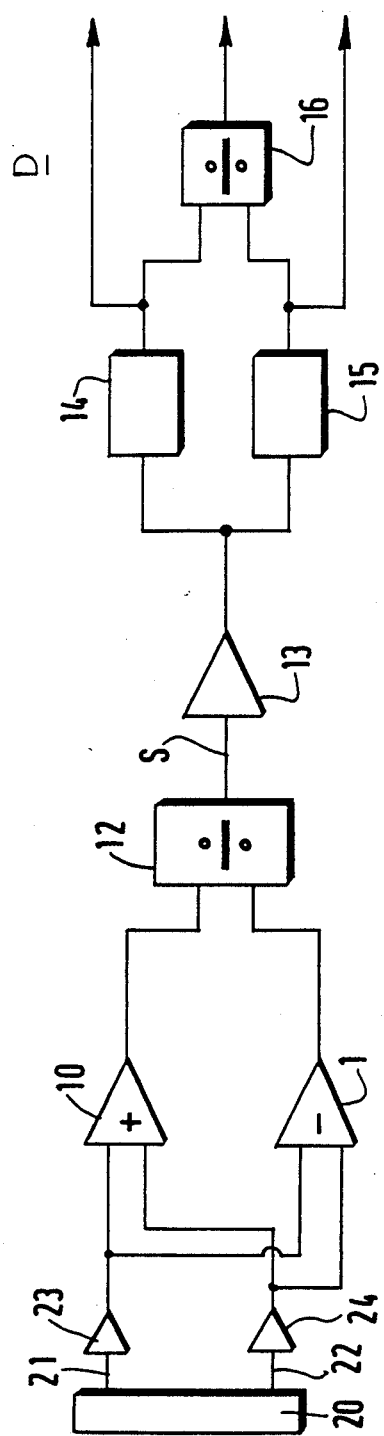
FIG. 2 is a block diagram showing the processing modules of the device according to the invention.

The first example of an embodiment that will be described concerns a device suitable for the continuous determination of a creping index for a moving sheet of creped paper. It mainly concerns a device suitable for installation in the production line of the creped paper when emerging from the yankee, just before its storage on the winder cylinder. However, it is obvious that the invention would not be limited to this type of embodiment and that the device described could just as well be adapted for any type of sheet material having surface variations.

The device according to the invention comprises a 10 milliwat helium-neon laser (1) emitting a circular polarized beam (2). This laser (1) is supplied with power in a known way by means of a cable connected to a standard power supply not shown. In order that the measurements made shall not be distorted, the laser beam (2) is not directed perpendicularly to the sheet of moving creped paper (3) to be analyzed. The beam (2) passes through an optical system (4) consisting of a cylindrical astigmatic lens with a focal length of 100 millimeters intended to elongate the spot from the laser beam on the sheet (3) in the direction parallel to the undulations of the creped paper. In other words, the aim of the lens (4) is to transform the almost circular spot that the laser beam (2) would produce on the sheet (3) on its own into an elliptical spot with a minor axis of length less than the average pitch of the creping. "The average pitch of the creping" is to be understood as meaning the average distance between two consecutive peaks A and B of the undulations forming the creping. The use of an ellipse (e.g. 100×800 micrometers for an average pitch of 200 micrometers) rather than a circular spot makes it possible to eliminate the effect of the small holes that are often found in creped papers, which would distort the measurements carried out. In fact, if a spot passing across a hole were circular, the absence of back-scattered light would perturb the measurement.

The laser beam now elliptical in cross-section (5) is back-scattered (6) on the moving sheet (3) and then passes through another optical system with two lenses (7), whose function is to form an image in the plane defined by the sensitive surface of the position sensor (8), located just behind the optical system (7). A system (7) with two lenses is chosen so that the optical aberrations can be corrected.

The position sensor (8) consists of an LSD 30 D silicon cell, marketed by the United Detector Technology company. This cell comprises a sensitive surface (20) connected to two output connections (21, 22) each fitted with a current-voltage convertor (23, 24).

Each of these outputs (23, 24) delivers an electrical signal when it receives a light beam, this signal being a combined function of the quantity of light received and of the position of the point of impact (25) of the beam with respect to the two ends (26, 27) of the cell (20). The values of the respective currents at the two outputs (21, 22) are denoted by Y and X. The length of the cell (20) is considered to be normed, i.e. its length is taken to be unity. If the point of impact (25) of the back-scattered laser beam (6) on the cell (20) is at a distance a from the end (26) of the cell, it is therefore at a distance (1-a) from the end (27), since the cell has a length equal to unity. If the intensity of illumination on the cell (20) has a value E, when it is possible to write:

$$X = E \cdot a$$

$$Y = E \cdot (1-a).$$

After passing through the current-voltage convertors (23, 24), the output signals (21, 22) are passed on to an analog conditioner, denoted by the general reference letter C, which carries out the following operation:

$$S = \frac{X - Y}{X + Y} = \frac{E \cdot (2a - 1)}{E} = 2a - 1.$$

Thus, the output signal S from the conditioner C is independent of the value of the intensity of illumination E. It therefore provides a measurement of the position of impact (25) of the laser beam (5) on the moving sheet (3). In fact, if the position of the sensor (8) relative to the sheet (3) is changed, or vice versa, the point of impact (25) of the laser beam (6) on the cell will change and so will the value a.

In practice, the conditioner C consists of three amplifiers, i.e. a first (10) for carrying out the addition operations $X + Y$, a second (11) for carrying out the subtraction operation $X - Y$, and a third (12), which is a divider-amplifier for carrying out the operation that yields the quotient S.

The output signal S from the conditioner C is then filtered by means of a first-order high-pass filter (13). In order not to produce errors in the measurements carried out, it is necessary to eliminate the stray undulations, whose frequencies are generally much lower. It should be noted that this filter (13) can be adjusted according to the speeds with which the sheet (3) is moving and according to the average pitch (AB) of the surface undulations encountered.

Figure 3:
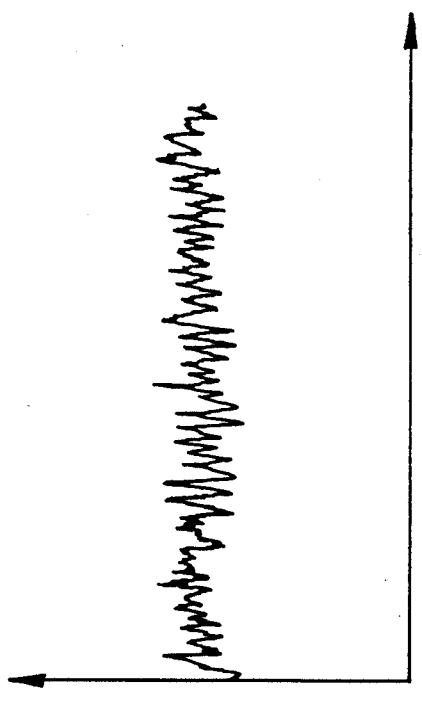
FIG. 3 is a representation of the result obtained on a cathode-ray oscilloscope by means of the device according to the invention.

The signal from the high-pass filter (13), whose general shape on an oscilloscope is shown in FIG. 3, is then processed by a circuit for calculating the RMS (or effective) value connected in parallel with a circuit for calculating the peak-to-peak amplitude of the modulation, denoted by the general reference letter D.

The RMS module (14) is an analog calculating module incorporating an integral low-pass filter in a standard way. The peak-to-peak circuit (15) consists of two modules in parallel, one calculating the minimum value of a modulation, the other calculating the maximum value of the modulation, with a third module forming the difference between these two values.

In order to obtain a signal which is representative of the form factor of the modulation analyzed, a divider module (16) determines the quotient of the RMS and peak-to-peak signals.

Finally, another electronic module (not shown) measures the period of the undulations, and from this it is possible to deduce the average pitch of the creping, knowing the speed with which the sheet to be analyzed is moving.

The signal, when reconstituted on a graphic recorder, can be used to follow the real-time variation of the creping on a machine. Among other things, the progress of the wear on the doctors can, in particular, be detected. What is being observed is the variation in the depth of the creping as the wear on the doctors increases.

Figure 4:
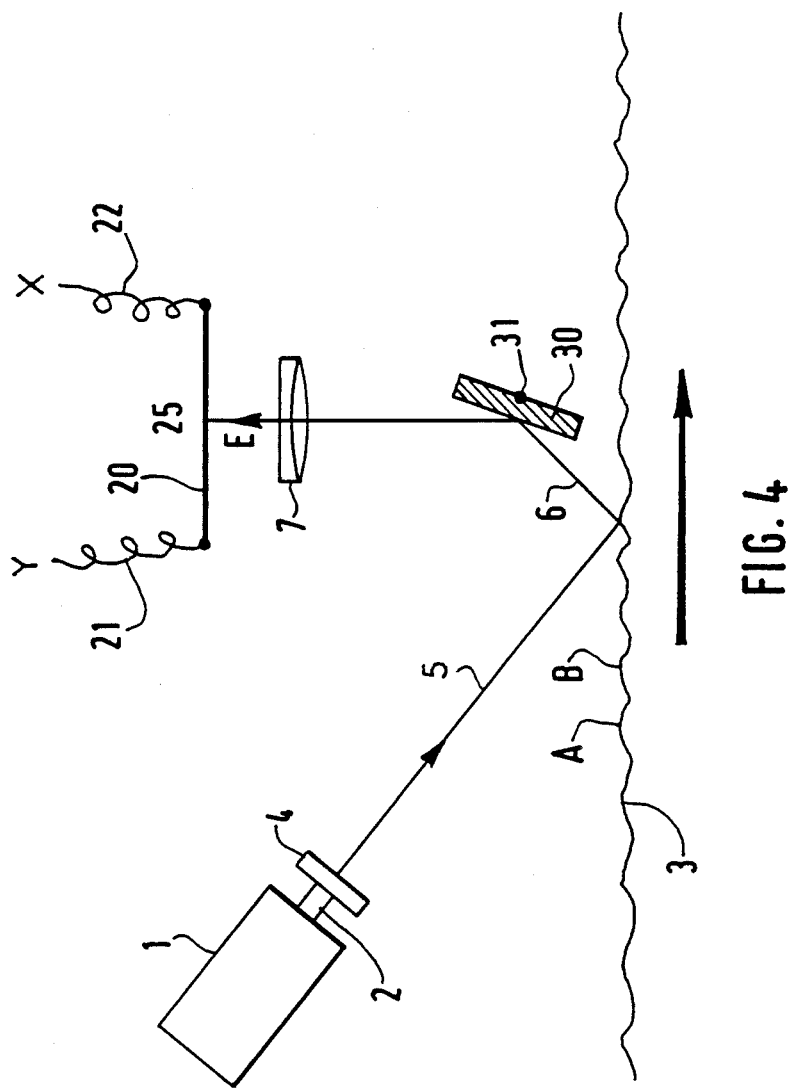
FIG. 4 is an outline representation of the optical system for another way of executing the invention.

In a second form of execution shown in FIG. 4, which can advantageously adapted, the back-scattered beam (6) is projected onto a plane mirror (30) mounted in such a way that it pivots about an axis (31). The position of this mirror (30) is automatically controlled by a motor (not shown). This arrangement enables the average position of the point of impact (25) of the back-scattered beam (6) to be maintained in a fixed position on the cell (20) by processing the electrical output signal from the divider amplifier (12) which is filtered before sending it to the control motor.

In the embodiment used in practice, all the constituent components of the device according to the invention are mounted on the same base plate, at the end of which is fixed a slightly arched flange, intended to come into contact with the moving sheet to be analyzed. A window is arranged at the center of this flange in order to allow the passage of the laser beam (5) at one point where it meets the sheet and the passage of the rays (6) back-scattered from the laser beam by the sheet to the mirror (30).

Many advantages emerge from the present invention which could not, until now, be obtained with other devices. The following may be mentioned:
- the possibility of continuous and permanent monitoring of the surface state of a sheet;
- the possibility of ensuring that the efficient operation of the production machine is monitored;
- in the example embodying the invention, the possibility of determining the variations in the thickness of the sheet by means of the measurement of the depth of the creping;
- the monitoring of wear in the doctor;
- a saving of time because of the greater ease with which adjustments can be made in order to obtain a product with determined characteristics.

The present invention is capable of supporting several applications, particularly the study of creped and microcreped papers. It can also be used for analyzing the state of any type of moving surface, e.g. fabrics, films, etc.

We claim:

1. A device for continuously determining a surface state index of a moving sheet which is creped in the form of undulations, the device comprising:
   a laser source which emits a beam toward a surface of the moving sheet;
   a first astigmatic optical system positioned between said laser source and the moving sheet for concentrating said beam emitted by said laser source to form a luminous spot at an area of the moving sheet to be analyzed, said first optical system transforming a shape of said beam emitted by said laser source such that said luminous spot is adapted to the direction and dimension of average pitch of the undulations;
   a second, convergent optical system disposed on the same side of the moving sheet as said first optical system for concentrating light which has been back-scattered by the moving sheet;
   an optoelectronic cell for receiving said concentrated light from said second optical system at a sensitive surface thereof, said optoelectronic cell producing electrical signals responsive to an impacting position of said concentrated light on said sensitive surface; and
   a processing system comprising means for determining the surface state index of the moving sheet using said electrical signals.

2. The device of claim 1, wherein the moving sheet consists of paper.

3. The device of claim 1, wherein the shape of said luminous spot is an ellipse, a major axis of said ellipse being parallel to the undulations and a minor axis of said ellipse having a length which is less than said average pitch of the undulations.

4. The device of claim 1, further comprising means for maintaining an average position of said concentrated light on said optoelectronic cell.

5. The device of claim 4, wherein said maintaining means consists of a mirror disposed in a path of said back-scattered light between the moving sheet and said second optical system.

6. The device of claim 1, further comprising a high-pass filter for filtering said electrical signals thereby removing stray low frequencies from said electrical signals passing therethrough.

7. The device of claim 6, further comprising at least one module for processing said filtered signal from said high-pass filter and thereby determining at least one value selected from the group consisting of a peak-to-peak value and an effective RMS value.

8. The device of claim 7, wherein said at least one module comprises a divider module for evaluating a form factor of said filtered signal from said high-pass filter, responsive to output from a module for determining said peak-to-peak value and output from a module for determining said RMS value.

9. The device of claim 8, further comprising means for evaluating said average pitch of the undulations.

* * * * *